(12) United States Patent
Stuart

(10) Patent No.: US 7,539,982 B2
(45) Date of Patent: May 26, 2009

(54) XML BASED SCRIPTING LANGUAGE

(75) Inventor: Anthony Franke Stuart, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 10/842,720

(22) Filed: May 7, 2004

(65) Prior Publication Data

US 2006/0004827 A1     Jan. 5, 2006

(51) Int. Cl.
*G06F 9/45* (2006.01)
*G06F 7/00* (2006.01)
*G06F 9/44* (2006.01)

(52) U.S. Cl. .................. 717/140; 707/102; 717/141; 717/142; 717/143; 717/115

(58) Field of Classification Search .......... 717/140–143
See application file for complete search history.

(56) References Cited

U.S. PATENT DOCUMENTS

| | | | |
|---|---|---|---|
| 5,581,691 A | 12/1996 | Hsu et al. | 395/182.13 |
| 5,630,069 A | 5/1997 | Flores et al. | 395/207 |
| 5,734,907 A * | 3/1998 | Jarossay et al. | 717/141 |
| 5,930,512 A | 7/1999 | Boden et al. | 395/710 |
| 5,960,420 A | 9/1999 | Leymann et al. | 707/1 |
| 5,978,836 A | 11/1999 | Ouchi | 709/206 |
| 6,038,541 A | 3/2000 | Tokuda et al. | 705/8 |
| 6,286,033 B1 | 9/2001 | Kishinsky et al. | 709/203 |
| 6,374,207 B1 * | 4/2002 | Li et al. | 703/27 |
| 6,393,456 B1 | 5/2002 | Ambler et al. | 709/200 |
| 6,516,322 B1 | 2/2003 | Meredith | 707/102 |
| 6,569,207 B1 | 5/2003 | Sundaresan | 715/513 |
| 6,606,642 B2 | 8/2003 | Ambler et al. | 709/200 |
| 6,763,499 B1 * | 7/2004 | Friedman et al. | 715/240 |
| 6,819,339 B1 * | 11/2004 | Dowling | 715/738 |
| 6,919,891 B2 * | 7/2005 | Schneider et al. | 345/440 |
| 6,996,517 B1 * | 2/2006 | Papaefstathiou | 703/22 |
| 6,996,773 B2 * | 2/2006 | Friedman et al. | 715/240 |

(Continued)

FOREIGN PATENT DOCUMENTS

DE        10142024 A1      3/2003

(Continued)

OTHER PUBLICATIONS

"Jelly: Executable SML", pp. 1-3, "http:/www.w3.org/TR/xexpr/#id-0008", The Apache Jakarta Project.*

(Continued)

*Primary Examiner*—Wei Y Zhen
*Assistant Examiner*—Chih-Ching Chow
(74) *Attorney, Agent, or Firm*—Patterson & Sheridan, LLP

(57) ABSTRACT

Various embodiments of a method, apparatus, and article of manufacture for processing an extensible markup language (XML) script using an XML based scripting language are provided. The XML script is parsed. The XML script comprises element nodes. Each element node comprises a component name. A first element node comprises a first component name referencing a first user-defined component. An argument is passed to the first user-defined component. The argument is evaluated when an element node associated with the first user-defined component comprises an evaluate-component name that explicitly specifies that the argument be evaluated.

15 Claims, 4 Drawing Sheets

U.S. PATENT DOCUMENTS

| | | | |
|---|---|---|---|
| 7,111,286 B2 * | 9/2006 | Schrader et al. | 717/143 |
| 7,134,072 B1 * | 11/2006 | Lovett et al. | 715/513 |
| 7,152,229 B2 * | 12/2006 | Chong et al. | 717/146 |
| 7,243,098 B2 * | 7/2007 | Wang et al. | 707/4 |
| 2002/0073119 A1 * | 6/2002 | Richard | 707/513 |
| 2002/0178252 A1 * | 11/2002 | Balabhadrapatruni et al. | 709/223 |
| 2003/0172053 A1 * | 9/2003 | Fairweather | 707/1 |
| 2004/0103105 A1 * | 5/2004 | Lindblad et al. | 707/100 |
| 2004/0168124 A1 * | 8/2004 | Beisiegel et al. | 715/513 |
| 2005/0010896 A1 * | 1/2005 | Meliksetian et al. | 717/106 |
| 2005/0177543 A1 * | 8/2005 | Chen et al. | 707/1 |
| 2006/0015471 A1 * | 1/2006 | Wu | 707/1 |

FOREIGN PATENT DOCUMENTS

| | | |
|---|---|---|
| JP | 2002 041744 A | 2/2002 |
| JP | 2002 074253 A | 3/2002 |

OTHER PUBLICATIONS

"XEXPR- A Scripting Language for XML", W3C Note, Nov. 21, 2000, from http://www.w3.org/TR/xexpr/.

"XEXPR- A Scripting Language for XML", W3C Note, Nov. 21, 2000, from http://www.w3.org/TR/2000/NOTE-xexpr-20001121/.

"Smalltalk Blocks Are Thunks in Disguise" last edited Jan. 29, 2004, from http://c2.com/cgi/wiki?SmalltalkBlocksAreThunksInDisguise.

"Lazy evaluation—Wikipedia", last modified Mar. 26, 2004, from http://en.wikipedia.org/wiki/Lazy_evaluation.

"XMLEncoder (Java 2 Platform SE v1.4.2)," copyright 2003, from http://java.sun.com/j2se/1.4.2/docs/api/java/beans/XMLEncoder.html.

"XMLDecoder (Java 2 Platform SE v1.4.2)," copyright 2003, from http://java.sun.com/j2se/1.4.2/docs/api/java/beans/XMLDecoder.html.

"Introduction to XUL", Jun. 30, 1999, from http://www.mozilla.org/xpfe/xptoolkit/xulintro.html.

"IDE is released with Bambookit GUI.2.5", Sep. 15, 2003, from http://www.bambookit.com/_press_release_bambookit_2_5_released.html.

Patrick Chanezon's Radio WebLog "Jelly and Maven: more good stuff from the Jakarta project!" Wednesday, Sep. 11, 2002, from http://radio.weblogs.com/0105673/2002/09/11.html.

Research Disclosure, 436174, "User-controlled notification in workflow management systems," pp. 1490-1491, Aug. 2000.

"The Codehaus::Home", copyright 2004, from http://werkflow.werken.com/.

"Jelly—Jelly : Executable XML", "The Jakarta Project", Last published: Apr. 1, 2004, from http://jakarta.apache.org/commons/jelly/.

Gregor von Laszewski et al, "GridAnt: A Client-Controllable Grid Workflow System," 37th Hawai'i International Conference on System Science, Jan. 5-8, 2004, Island of Hawaii, Big Island, downloaded from http://www-unix.mcs.anl.gov/~laszewsk/papers/vonLaszewski—gridant-hics.pdf.

"Tambora—Architecture," copyright 2001-2003, Zenplex Inc., from http://tambora.zenplex.org/architecture.html.

"Functional programming—Wikipedia", last modified Mar. 20, 2004, from http://en.wikipedia.org/wiki/Functional_programming.

"3.1—The Box Model," XUL Planet, Copyright 1999-2004 XulPlanet.com, from http://www.xulplanet.com/tutorials/xultu/boxes.html.

"3.5—Adding More Elements," Copyright 1999-2004 XulPlanet.com from http://xulplanet.mozdev.org/tutorials/xultu/boxfinal.html.

ITworld.com—Specialty scripting languages, Unix Insider Nov. 3, 2000, from http://www.itworld.com/AppDev/4061/swol-1103-regex/.

XUL Tutorial—Single Document Version, Adding Methods, accessed on Apr. 1, 2004, from http://www.xulplanet.com/tutorials/xultu/allofit.zip.

Control the Flow of Transformation (MSXML 4.0 SDK), Copyright 2001-2003, 2004 Microsoft Corporation, from http://msdn.microsoft.com/library/en-us/xmlsdk/htm/xslt_howdoi_1k53.asp?frame=true.

Hello, World! (XSLT) (MSXML 4.0 SDK), copyright 2001-2003, 2004 Microsoft Corporation, from http://msdn.microsoft.com/library/en-us/xmlsdk/htm/xslt_starter_2uhw.asp?frame=true.

Lesson 1: Authorizing XML Elements (MSXML 3.0 SDK), copyright 1999-2003, 2004 Microsoft Corporation, from http://msdn.microsoft.com/library/en-us/xmlsdk30/htm/xmtuttut1authoringelements.asp?frame=true.

"XBL (Extensible Binding Language) 1.0," copyright 1998-2004 The Mozilla Organization, Last modified, Jan. 3, 2003,from http://www.mozilla.org/projects/xbl/xbl.html.

"XSL Transformations (XSLT)," W3C Recommendation, Nov. 16, 1999, http://www.w3.org/TR/xslt.

"Extensible Stylesheet Language (XSL), Version 1.0," W3C Recommendation, Oct. 15, 2001, downloaded from http://www.w3.org/TR/2001/REC-xsl-20011015/xslspecRX.pdf.

* cited by examiner

XML BASED SCRIPTING LANGUAGE

BACKGROUND OF THE INVENTION

1.0 Field of the Invention

This invention relates generally to scripting languages, and more particularly to an XML based scripting language.

2.0 Description of the Related Art

Workflow management systems are computer applications which define, manage and execute business processes. A process is defined as a series of steps leading to a desired result. A process is analogous to a flowchart, and process steps are analogous to the boxes on a flowchart. A process transition represents the flow of control between steps. These process transitions are analogous to the lines connecting the boxes on a flowchart. Document routing systems and business process integration systems are examples of workflow management systems.

Using a workflow management system typically consists of two major types of activity: design time activity and run time activity. Design time activity consists of understanding a business requirement, creating a process that satisfies the requirement, and defining the process to the workflow management system. The design time activity occurs infrequently, relative to the run time activity. Run time activity consists of executing the process created during the design time activity. Typical processes are created once and run many times. Processes may also be modified during their life to adapt to changing business requirements.

At run time, a component of the system, typically referred to as a workflow engine, is responsible for accepting work from external sources, sequencing the work from step to step in the process, for example, using conditional logic and/or the transitions that are defined between steps, and waiting for the step to be performed. Steps include manual steps that require user interaction, and automated steps that can be invoked directly by the workflow engine.

Users interact with manual steps using a user interface, which is typically graphical. Depending on the type of step, the user interface may be general or custom. A general user interface works for many types of manual steps. The user interface typically displays lists of work to do and lets the user update the status of the work. This updated status is used by the workflow engine to make decisions about how to route the work to a subsequent step, for example, success or failure. A custom user interface may be required when the work performed in the step is specific to the step.

Automated steps typically consist of off-the-shelf and custom applications that are invoked directly by the workflow engine. Examples include applications that process data sets, for example, sorting, indexing, barcoding and formatting, or applications that interact with hardware devices.

Workflow management systems typically separate the business or flow-level logic from the task or application-level logic so that the business logic or process can be manipulated and managed independently of the applications that support it. Many workflow management systems provide a means for implementing steps and graphical user interfaces, typically, through the use of a programming language. Over the years, many languages have been used for this purpose, including interpreted scripting languages and compiled executable languages. The purpose of the programmability is to provide the interface between the workflow system and the external environment in which the workflow system executes, that is, the outside world. This may be as simple as providing the glue that links the workflow constructs to external constructs, for example, retrieving workflow data from a database, formatting an argument list, invoking an external program and storing the resulting status in the workflow database. Alternately, this may be as complex as providing a fully featured graphical user interface.

There are problems with existing approaches to this type of programmability in workflow management systems. Developing compiled programs requires advanced skills in software development. This detracts from the promise of workflow management as a means of simplifying development processes. In addition, compiled programs require a series of time consuming design, edit-compile, and link-test debug cycles. These cycles are difficult to integrate into the workflow management environment.

Scripting languages may lower the level of skill required, but often this comes at the cost of providing a less rigorous approach to solving the problem. In addition, scripting languages typically do not provide access to of-the-shelf software for reuse, such as, Java® (Java is a registered trademark of Sun Microsystems, Inc.) class libraries.

The Extensible Markup Language (XML) is a standard for the exchange of information on the World Wide Web, and elsewhere. The World Wide Web consortium provides an XML recommendation. With the emergence of XML standards for defining business processes, for example, the Business Process Execution Language (BPEL), it would be desirable to have a scripting language that plugs-in to the XML framework.

Therefore there is a need for an improved scripting language that plugs-in to the XML framework. The scripting language should also allow other software to be accessed.

SUMMARY OF THE INVENTION

To overcome the limitations in the prior art described above, and to overcome other limitations that will become apparent upon reading and understanding the present specification, various embodiments of a method, apparatus, and article of manufacture for processing an XML script using an XML based scripting language are provided.

In various embodiments, an XML script is parsed. The XML script comprises element nodes. Each element node comprises a component name. A first element node comprises a first component name referencing a first user-defined component. An argument is passed to the first user-defined component. The argument is evaluated when an element node associated with the first user-defined component comprises an evaluate-component name that explicitly specifies that the argument be evaluated.

In some embodiments, a second element node comprises a second component name. The second component name is associated with a component that is external to the scripting language and XML script.

In this way, an improved XML based scripting language is provided. In some embodiments, the scripting language allows access to other software.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to provide an XML based scripting language. Various embodiments of a method, apparatus, and article of manufacture for the XML based scripting language are described.

In various embodiments, an XML script is processed using an XML based scripting language. The XML script is parsed. The XML script comprises element nodes. Each element node comprises a component name. A first element node comprises a first component name referencing a first user-defined component. An argument is passed to the first user-defined component. The argument is evaluated when an element node associated with the first user-defined component comprises an evaluate-component name that explicitly specifies that the argument be evaluated.

Figure 1:
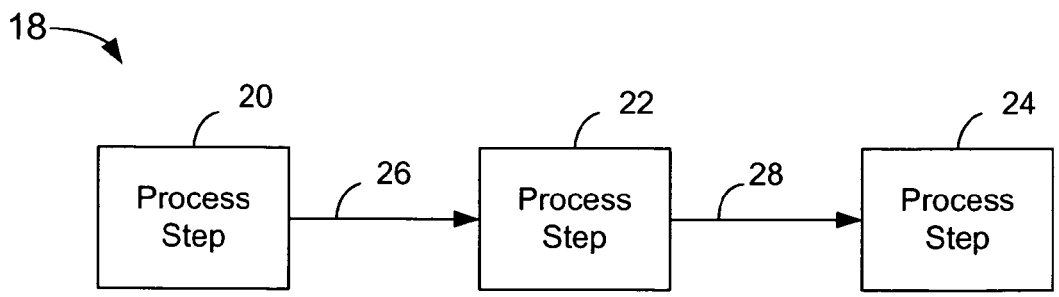
FIG. 1 depicts an exemplary workflow management system suitable for use with various embodiments of the present invention.

FIG. 1 depicts an exemplary workflow management system 18 suitable for use with various embodiments of the present invention. The workflow management system 18 has a series of process steps 20, 22 and 24. Process transitions 26 and 28 represent the flow of control between the process steps 20, 22 and 24. In various embodiments, scripts are written using the XML based scripting language to implement the process transitions. In other embodiments, scripts are written using the XML based scripting language to implement the process steps.

Figure 2:
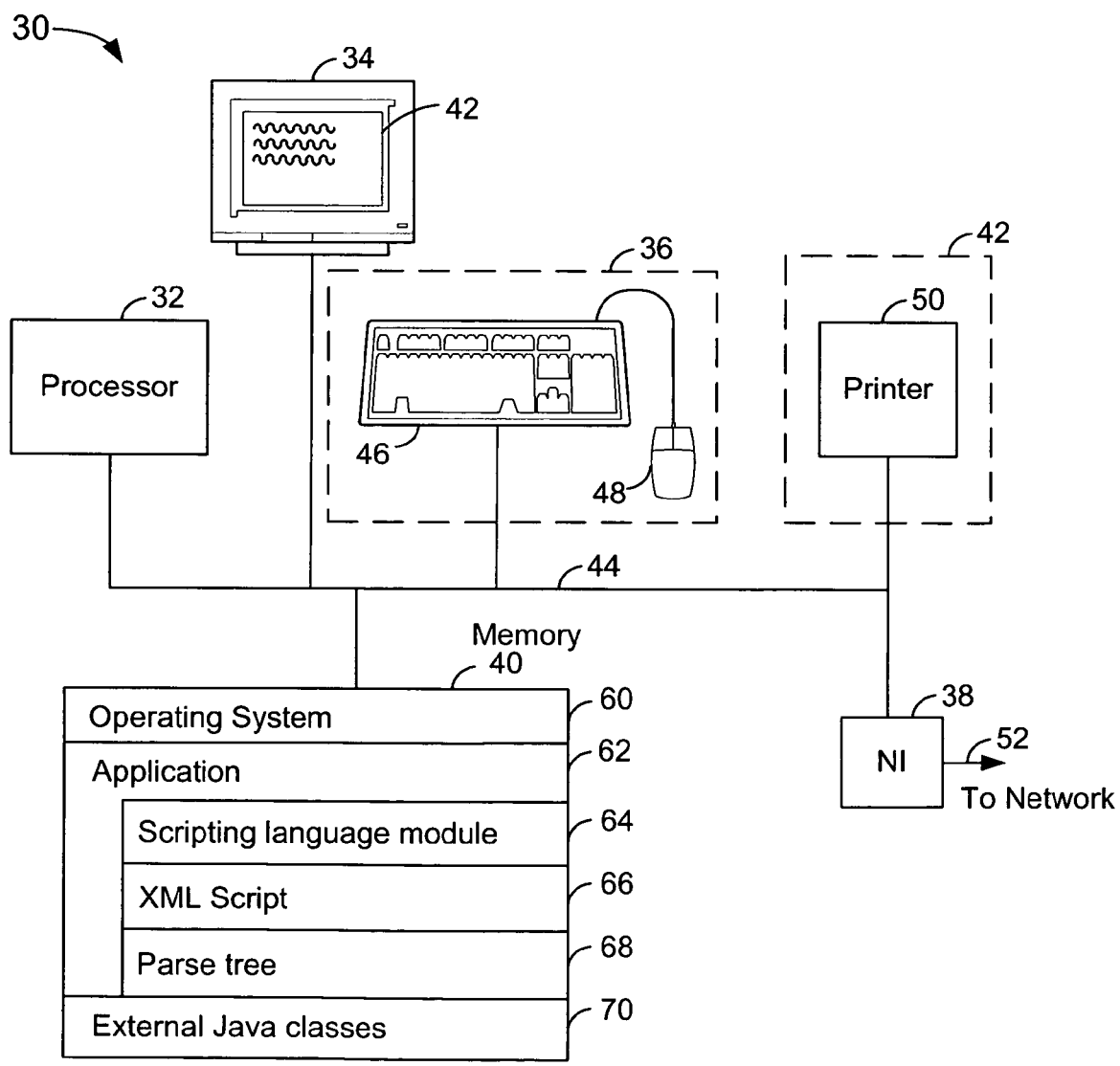
FIG. 2 depicts an illustrative computer system which uses various embodiments of the present invention.

FIG. 2 depicts an illustrative computer system which uses various embodiments of the present invention. The computer system 30 comprises a processor 32, display 34, input interfaces (I/F) 36, communications interface 38, memory 40 and output interface(s) 42, all conventionally coupled by one or more buses 44. The input interfaces 36 comprise a keyboard 46 and mouse 48. The output interface 42 is a printer 50. The communications interface 38 is a network interface (NI) that allows the computer 30 to communicate via a network, such as the Internet. The communications interface 38 may be coupled to a transmission medium 52 such as, for example, twisted pair, coaxial cable or fiber optic cable. In another exemplary embodiment, the communications interface 38 provides a wireless interface, that is, the communications interface 38 uses a wireless transmission medium.

The memory 40 generally comprises different modalities, illustratively semiconductor memory, such as random access memory (RAM), and disk drives. In some embodiments, the memory 40 stores an operating system 60, an application program 62, a scripting language module 64, an XML script 66, a parse tree 68, and, in some embodiments, external Java classes 70.

The scripting language module 64 is typically an interpreter which interprets the XML script 66. In some embodiments, the scripting language module 64 is an interpreter that is a functional programming engine with an imperative programming personality. For example, imperative programming languages typically provide a basic verb-object syntax, such as print "Hello world".

As shown in FIG. 2, the scripting language module 64 is embedded in the application 62. In other embodiments, the scripting language module 64 is a stand-alone program, rather than being embedded in the application 64. In some embodiments, the application 62 is a workflow management system.

In various embodiments, the specific software instructions, data structures and data that implement embodiments of the present inventive technique are incorporated in the scripting language module 64 and, in some embodiments, the XML script 66. Generally, an embodiment of the present invention is tangibly embodied in a computer-readable medium, for example, the memory 40 and is comprised of instructions which, when executed by the processor 32, cause the computer system 30 to utilize the embodiment of the present invention. The memory 40 may store a portion of the software instructions, data structures and data for any of the operating system 60, application 62, scripting language module 64, XML script 66, parse tree 68, and in some embodiments, external Java classes 70 in semiconductor memory, while other portions of the software instructions and data are stored in disk memory.

The operating system 60 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation) and LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as a network transmission line and wireless transmission media. Thus the article of manufacture may also comprise the medium in which the code is embedded. Those skilled in the art will recognize that many modifications may be made to this configuration without departing from the scope of the present invention.

The exemplary computer system illustrated in FIG. 2 is not intended to limit the present invention. Other alternative hardware environments may be used without departing from the scope of the present invention.

In some embodiments, the scripting language module is implemented using the Java programming language, and will be described with reference to the Java programming language. However, the scripting language is not meant to be limited to implementations using the Java programming language, and in other embodiments, may be implemented using other programming languages.

In various embodiments, the scripting language is object oriented. A user may create user-defined functions, classes and methods.

An XML document is typically comprised of XML nodes. In various embodiments, the scripting language module uses three types of XML nodes—element nodes, text nodes and comment nodes.

Element nodes represent functions, classes and methods. In this description, a method that is a function which is closely associated with a class, object class or an instance of an object is also referred to as a class method. XML element nodes are identified from the less than (<) and greater than (>) characters. The text between the less than and greater than characters is the name of the element node, also referred to as an XML element name or a component name. Collectively, the entire group comprising the less than and greater than characters, and the text in between, for example, <Block>, is referred to as an XML tag.

The component name can reference a built-in component and a user-defined component. Built-in components comprise built-in functions and built-in methods. User-defined components comprise user-defined functions and user-defined methods. In various embodiments, each XML element node contains only a component name.

The slash character (/) is an XML terminator which indicates the end of an element node. XML tags generally appear in pairs of start tags and end tags. In the example, <Print> and <Block> are start tags, and </Print> and </Block> are end tags.

XML text nodes represent scripting language module literals. Text nodes are contained in either a "Name" tag for the names of user-defined items, or a "Value" tag, for numeric, character string or Boolean literals.

Comment nodes represent scripting language module comments. Comments are source code annotations which communicate information to the programmer. A comment tag is represented as <!-- -->.

The nodes in an XML document are typically organized into a hierarchy, with some nodes being subordinate to other nodes. Any node that appears between the start tag and the end tag of another node is a subordinate node. The subordinate nodes are referred to as inside, below or children of other nodes. If an element node does not have any subordinate nodes, the start tag and end tag for that element node can be simplified into a single element tag, for example, <Print/>. A node that is outside, above or the parent of a subordinate node is referred to as a superordinate node.

The following is an exemplary script, written in the scripting language, that prints "Hello World".

```
<Block>
    <Print>
        <Value>Hello World</Value>
    </Print>
</Block>
```

Figure 3:
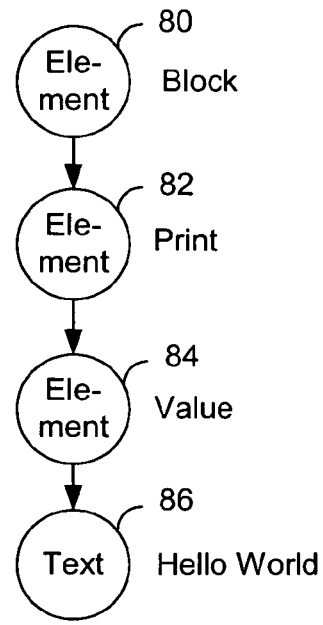
FIG. 3 depicts an exemplary parse tree.

FIG. 3 depicts a diagram of the nodes in an exemplary parse tree for the exemplary script above. "Block," "Print" and "Value" are built-in functions of the scripting language, which will be described in further detail below, and are associated with Block, Print and Value nodes, 80, 82 and 84, respectively, which are all element nodes. The literal, "Hello World," is associated with a text node 86. This exemplary parse tree has no comment nodes.

The Print node 82 is a subordinate of the Block node 80, the Value node 84 is a subordinate, or child, of the Print node 82, and the Hello World node 86 is a subordinate, or child, of the Value node 84. The Print node 82 is a superordinate, or parent, of the Value node 84, and the Block node 80 is a superordinate, or parent, of the Print node 82. In FIG. 3, the Block node 80 is the highest level node, that is, the Block node has no parents, and is referred to as a root node.

In the scripting language, an XML element node is evaluated as a function call. In various embodiments, an element node of the scripting language comprises any one of a built-in function, a user-defined function, a built-in method or a user-defined method. A built-in function is provided by the scripting language. In some embodiments, the scripting language provides a set of built-in functions which can be used to create user-defined functions, user-defined classes, user-defined methods and user-defined objects. The scripting language also provides built-in functions which perform basic arithmetic, logical and flow of control operations. In various embodiments, in the scripting language module, the built-in functions are implemented as methods, referred to as interpreter methods.

A user-defined function is created within an XML script by invoking a "DefineFunction" built-in function. A user-defined method is created within an XML script by invoking a "DefineMethod" built-in function. A built-in method is external to the scripting language and will be described in further detail below.

In various embodiments, user-defined names for variables, functions, classes and methods are defined using a "Name" built-in function, which contains a literal value—the name of the object.

In the scripting language, function calls are represented in XML as start tag/end tag pairs. Alternately, a function may be called using a "Call" tag, that is, a "Call" built-in function. A function call is also referred to as an invocation or a reference. In various embodiments, argument lists are specified as subordinate nodes. In other words, the arguments of a function are the nodes between the XML start and end tags. For example, in the following XML fragment, <Print>Hello World</print>, the argument for the "Print" built-in function is a text node associated with "Hello World". The "Print" built-in function automatically evaluates its argument. In another example, in the following XML fragment, <a><b/></a>, where "a" and "b" are user-defined functions, function "b" is an argument of function "a". In contrast to the "Print" function, function "b" is evaluated when function "a" explicitly invokes an "EvaluateArgument" built-in function for its argument, function "b". If a function call does not comprise any arguments, for example, function "b" above, then that function call can be specified as a single element tag.

In various embodiments, a method, or class method, is a function that is associated with an object class or an instance of an object class. Method calls are represented similar to function calls, except that the method and the method name may be qualified by the name of a variable that stores a reference to an object of a class. For example, "dialogBox.show" is a qualified method reference in which "dialogbox" is the name of a variable that stores a reference to an object of a class, in this example, a dialog box, and "show" is a method provided by that class.

Figure 4:
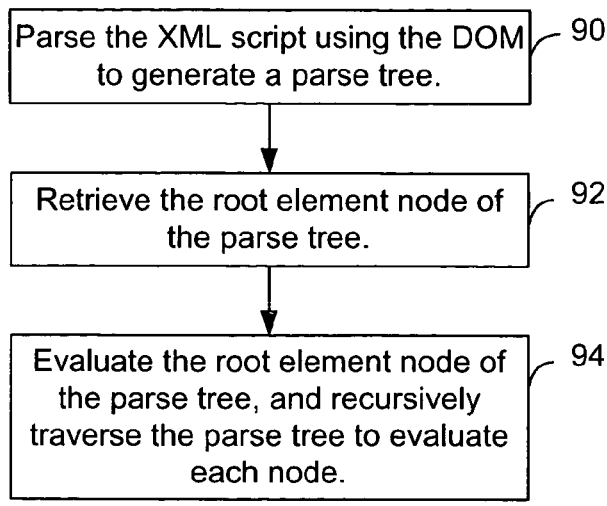
FIG. 4 depicts a high-level flowchart of an embodiment of the evaluation of an XML script by the scripting language module of FIG. 2.

FIG. 4 depicts a high-level flowchart of an embodiment of the evaluation of an XML script by the scripting language module of FIG. 2. In step 90, the scripting language module parses the XML script, using the Document Object Model (DOM), to create a parse tree from the XML script. Typically, the DOM is a component of the standard Java application programming interface (API) for XML processing. The scripting language module interprets the parse tree directly. In various embodiments, the scripting language module interprets the entire XML script before executing it.

In step 92, the scripting language module retrieves the root XML element node of the parse tree. In step 94, the scripting language module evaluates the root XML element. The scripting language module starts the evaluation with the root element node, and recursively traverses the parse tree to evaluate each node. In various embodiments, each element node in the parse tree is evaluated as a function.

In various embodiments, the scripting language supports both user-defined objects and external objects. Objects comprise functions, classes and methods. User-defined objects are defined within the XML script. External objects are external to the scripting language module. In some more particular embodiments, the external objects are Java objects. In various embodiments, the external Java objects can be accessed without using a Java compiler. In other embodiments, user-defined objects may implement Java interfaces. In various embodiments, the scripting language module uses the Java reflection APIs to provide access to external Java objects and methods. The Java reflection API provides programmatic access to the Java classes, interfaces and objects that comprise a Java runtime environment. In some embodiments, the scripting language module uses the Java reflection API to provide dynamic support for Java object creation and method invocation. In various embodiments, an external Java method uses the Java Native Interface (JNI) to invoke functions implemented using other, for example, compiled, languages.

In some embodiments, the scripting language module is embedded into existing applications. For example, the scripting language module may be embedded into existing applications that are already using XML as an interchange or persistence mechanism. In other embodiments, the scripting language is used as an intermediate language due to the ease with which the XML representation can be manipulated using GUI builders or XML generators, for example, the extensible stylesheet language (XSL).

In various embodiments, the scripting language can be used to add dynamic programmed behavior to applications and XML data streams. In some embodiments, the scripting language is used to add action, for example, behavior as a function of time, or parameters, to the typically static, object and attribute oriented nature of XML. In various embodiments, the scripting language and XML scripts written in the scripting language are embedded in XML data streams to add dynamic behavior to the static XML data. For example, in a Web Service, it is often advantageous, from a performance standpoint, to batch up or combine several requests into a single XML document. Without a way to add dynamic behavior to the document, the processing performed by the Web Service is limited. Using the dynamic programmed behavior provided by the scripting language, it is possible for the XML document to decide how to control the operation once it is being processed by the Web Service, for example, retrieve this document; if it contains this data, then retrieve that document. In some embodiments, the scripting language module can be embedded into applications to make the applications configurable by the end user.

In various embodiments, XML tags are either function or method references, or arguments to a function or method invocation, respectively. In some embodiments, the scripting language module uses dynamic argument, parameter evaluation to provide an extensible block structured flow-of-control model. In other words, new flow-of-control constructs can be added. In various embodiments, the scripting language module evaluates arguments when referenced in the called function using an "EvaluateArgument" built-in function. Evaluating arguments when referenced enables the implementation of user-defined flow of control constructions because an argument, which itself may be a function reference, may be evaluated zero or more times. Argument lists can be nested and can comprise literals and variables, as well as calls to other functions and methods. For example, a user-defined flow of control construction may be a dynamically optimized case function in which the most frequently occurring case is tested first.

Various embodiments of the scripting language, implemented by the scripting language module, will now be described in further detail. In some embodiments of the scripting language, names are specified using the "Name" built-in function. The "Name" built-in function is used to name user-defined variables, functions, classes, and methods The "Name" built-in function contains a literal value—the name of the object. Typically, the first character of a name is alphabetic, and subsequent characters are alphanumeric. Values are stored in variables using the "Set" built-in function and retrieved using the "Get" built-in function.

In some embodiments, the scripting language is case sensitive. The names of the built-in functions begin with an uppercase character. To avoid unintentional collisions with these names, user-defined variables, functions, classes and methods typically begin with a lower case character.

In general, the scripting language converts internally between data types. Variables can contain a reference to any data type. In various embodiments, the supported data types comprise strings, integers, floating point numbers, and Boolean values. Other data types are passed transparently between methods.

In various embodiments, the scripting language comprises literals, variables, functions, classes and methods. Literals are constant values that do not change throughout the life of a script. Literals are initialized as character strings, and are converted to other types as needed by the scripting language as follows:

| Boolean | Boolean value (true or false) |
| Float | 32 bit single precision floating point |
| Integer | 32 bit signed integer |
| String | Variable length character string |

In some embodiments, literals, such as numbers, or character strings are specified using the "Value" built-in function, for example:

<Value>12345</Value>.

Variables are named storage locations. A variable can store a reference to a value of any type. A variable is defined the first time a value is stored in it using the Set built-in function. An error occurs if an attempt is made to retrieve the value of a variable before it has been defined. For example, variable x is set equal to one as follows:

```
<Set>
    <Name>x</Name>
    <Value>1</Value>
</Set>
```

The scope of a variable determines its visibility, that is, where it can be accessed. In various embodiments, the scripting language typically provides three types of scope—local, instance and global.

Local variables are typically used for short term transient storage, for example, buffers and loop variables. Local variables are visible within the function that defines them. Local variables are initialized each time the function is invoked and are valid until the function returns. Each function typically has its own set of local variables that are independent of the local variables in other functions, even those with the same name. Local is the default scope for the scripting language variables.

Instance variables are typically used for storing the attributes of objects. Instance variables are visible within the class in which they are defined, that is, the class constructor and methods. The instance variables are initialized once per instance of the object, and are valid throughout the life of the object. Each object of each class has its own set of instance variables that are independent of the instance variables in other objects, even those with the same name. Instance variables are identified by their name and begin with the prefix "instance," for example, instance.title.

Global variables are typically used for storing program-wide information. A single set of global variables is visible to all functions and methods within a script. In some embodiments, because global variables are a shared resource, and because global variables provide the potential for unanticipated access, global variables are used sparingly. Global variables are identified by their name and begin with the prefix "global." In various embodiments, to avoid naming conflicts, the name is constrained so that the user defined portion of the name begins with the name of the defining function or method, for example, global.myFunctionStartTime. A value is stored in a variable using the "Set" built-in function, and retrieved from a variable using the "Get" built-in function. For example, the variable, global.evaluationOrder is set equal to zero using the "Set" built-in function, and the value of global.evaluationOrder is retrieved using the

```
<Set><Name>global.evaluationOrder</Name><Value>0</Value></Set>
<Get><Name>global.evaluationOrder</Name></Get>.
```

In various embodiments, a function comprises a named collection of calls to other functions. In some embodiments, an XML script comprises user-defined functions. Because users may write their own functions and methods, the scripting language is extensible. In some embodiments, user-defined functions and methods are passed values via an argument list and may return a result as a function or method value.

In various embodiments, the scripting language provides a "DefineFunction" built-in function to define a user-defined function. In some embodiments, an item comprises a start tag <x> and an end tag </x>, or alternately is <x/>, where x is a function or method. The syntax of "DefineFunction" contains two items:

item1—name of user-defined function
    item2—body of user-defined function

For example, a user-defined function, called functionOne, is defined as follows:

```
<DefineFunction>
    <Name>functionOne</Name>
    <Block>
        ...
    </Block>
</DefineFunction>
```

In the example above, item1 defines the name of the function, functionOne by calling the "Name" built-in function using the XML tags <Name> and </Name>. Item 2 defines the body of the function using <Block> and </Block> tags.

Subsequently, in various embodiments, the user-defined function, called functionOne, is called or invoked as follows:

```
<functionOne>
    ...
</functionOne>
```

User-defined functions are loaded dynamically when called or invoked. When the user-defined function is called, control is transferred to the body of the user-defined function specified by item2. The user-defined function body can access arguments that are passed to the user-defined function using the "EvaluateArgument" built-in function. A user-defined function can return a value using a "Return" built-in function.

A class is a template for an object. A class supports the basic concepts of object oriented programming, including inheritance, polymorphism and encapsulation of code and data. User-defined classes are created using the "DefineClass" built-in function. The syntax of the "DefineClass" built-in function contains two items:

item1—the name of new class
    item2—the constructor for new class

The "DefineClass" built-in function defines a new class with the name specified by item1. When an instance of the class is created using CreateObject, the constructor specified by item2, typically a "Block" built-in function, is executed. The constructor can invoke the "EvaluateArgument" built-in function to access items that were passed to it. The constructor can invoke an "ExtendClass" built-in function to extend an existing class. The constructor can invoke a "DefineMethod" built-in function to define methods for the class. The constructor can invoke an "ImplementInterface" built-in function to implement an external, and in some more particular embodiments, a Java interface.

For example, a class, called classOne, is created as follows:

```
<DefineClass>
    <Name>classOne</Name>
    <Block>
        <DefineMethod>
            <Name>methodOne</Name>
            <Block> ... </Block>
        </DefineMethod>
    </Block>
</DefineClass>
```

In various embodiments, user-defined classes implement Java interfaces using the "ImplementInterface" built-in function. The "ImplementInterface" built-in function contains a single item, that is, the name of the implemented Java interface. For example, an interface is implemented as follows:

```
<ImplementInterface>nameOfTheJavaInterface</
    ImplementInterface>.
```

The "CreateObject" built-in function creates an object, which is an instance of a class. In addition to creating instances of user-defined classes, the scripting language allows objects that are instances of Java classes to be created. In some embodiments Java class names are fully qualified using the Java package name, for example, java.lang.String. In Java, "packages" are used to group collections of related classes. Each class, therefore, is uniquely identified by a fully qualified name, which is the package name and the class name. The "CreateObject" built-in function contains two items:

item1—the name of class of object to create
    item2—the container for argument list for constructor The "CreateObject" built-in function creates an instance of the class specified by item1, which may be the name of a user defined class created using the "DefineClass" built-in function or the fully qualified name of a Java class. The arguments to the class constructor are supplied within the container specified by item2. The "CreateObject" built-in function returns a reference to the newly created object. Any number of arguments to the class constructor can be nested inside item1.

For example, an object is created as follows:

```
<CreateObject>
    java.lang.String
</CreateObject>
```

In various embodiments, classes are loaded dynamically when referenced. In some embodiments, if a class reference cannot be resolved to a class that is defined in the current XML script, the scripting language module automatically searches for a file containing the class definition.

The "DefineMethod" built-in function defines a user-defined method, a class method. A user-defined method can be defined within the bounds of a class, and is associated with the innermost containing class. The "DefineMethod" built-in function contains two items:

item1—name of new method
    item2—body of new method

The "DefineMethod" built-in function defines a new method with the name specified by item1. Methods are similar to functions, except that methods are closely associated with a class. A method reference or call from within the class that defines it looks like a function reference. To reference or invoke a method on an object stored in a variable, the variable name, followed by a dot (.) followed by the method name is used. The "DefineMethod" built-in function can appear within a "DefineClass" constructor. The example above for "DefineClass", also defines a user-defined method, called methodOne, within the class, called classOne.

A built-in method is a class method that is referenced in an XML script that is external to the scripting language module and to that XML script. In some embodiments, a built-in method may be from an existing Java class library.

To invoke a user-defined or built-in method from within the class that defines it, the method name is specified, like a function. This is referred to as an unqualified user defined method reference. To invoke a method on another object, the name of the variable that contains an instance of the object, as well as the name of the method, separated by a dot (.) is used. This is referred to as a qualified user-defined reference.

An example of creating an interface to an external Java library will now be described. In this example, the "DefineClass", "DefineMethod" and "ImplementInterface built-in functions are used. In this example, an interface is created to an external Java library called the java.awt.event library, and a reference is created to that interface. A Java interface is a "contract" between a class that implements a set of one or more methods and a class that uses a set of one or more methods. In the example below, a class, called class2 is created using the "DefineClass" built-in function and implements the well-known Java "ActionListener" interface. The ActionListener interface consists of a single method named actionPerformed. The actionPerformed method is passed an instance of an ActionEvent object that describes the event. The Java graphical user interface framework invokes the actionPerformed method of the ActionListener interface as events occur (e.g. a button is clicked). This example illustrates a class that implements the ActionListener interface. As events occur, the Java framework invokes the actionPerformed method defined by class2. The actionPerformed method evaluates and prints the ActionEvent argument passed by the Java framework. There is some additional logic that registers class2 as interested in events, but that logic is outside the scope of this example.

```
<DefineClass>
    <Name>class2</Name>
    <Block>
        <DefineMethod>
            <Name>actionPerformed</Name>
            <Block>
                <Print>
                    <Value>The following event occurred</Value>
                </Print>
                <Print>
                    <EvaluateArgument>
                        <Value>0</Value>
                    </EvaluateArgument>
                </Print>
            </Block>
        </DefineMethod>
        <ImplementInterface>
            <Name>java.awt.event.ActionListener</Name>
        </ImplementInterface>
    </Block>
</DefineClass>
```

Identifiers comprise the names of variables, functions, classes and methods. In various embodiments, references to identifiers are resolved in the following order:

1. Variables (e.g., totalAmount);
2. Unqualified User-defined methods (e.g., create)
3. User-defined functions (e.g., initialize)
4. Built-in functions (e.g., Print)
5. Qualified User-defined methods (e.g., myClass.create)
6. Built-in method of an instance of a Java class (e.g., file.readLine).

In some embodiments, a lower case alphabetic character is used as the first character of an identifier and mixed case alphanumeric characters for any subsequent characters to distinguish user-defined names from built-in names.

Figure 5:
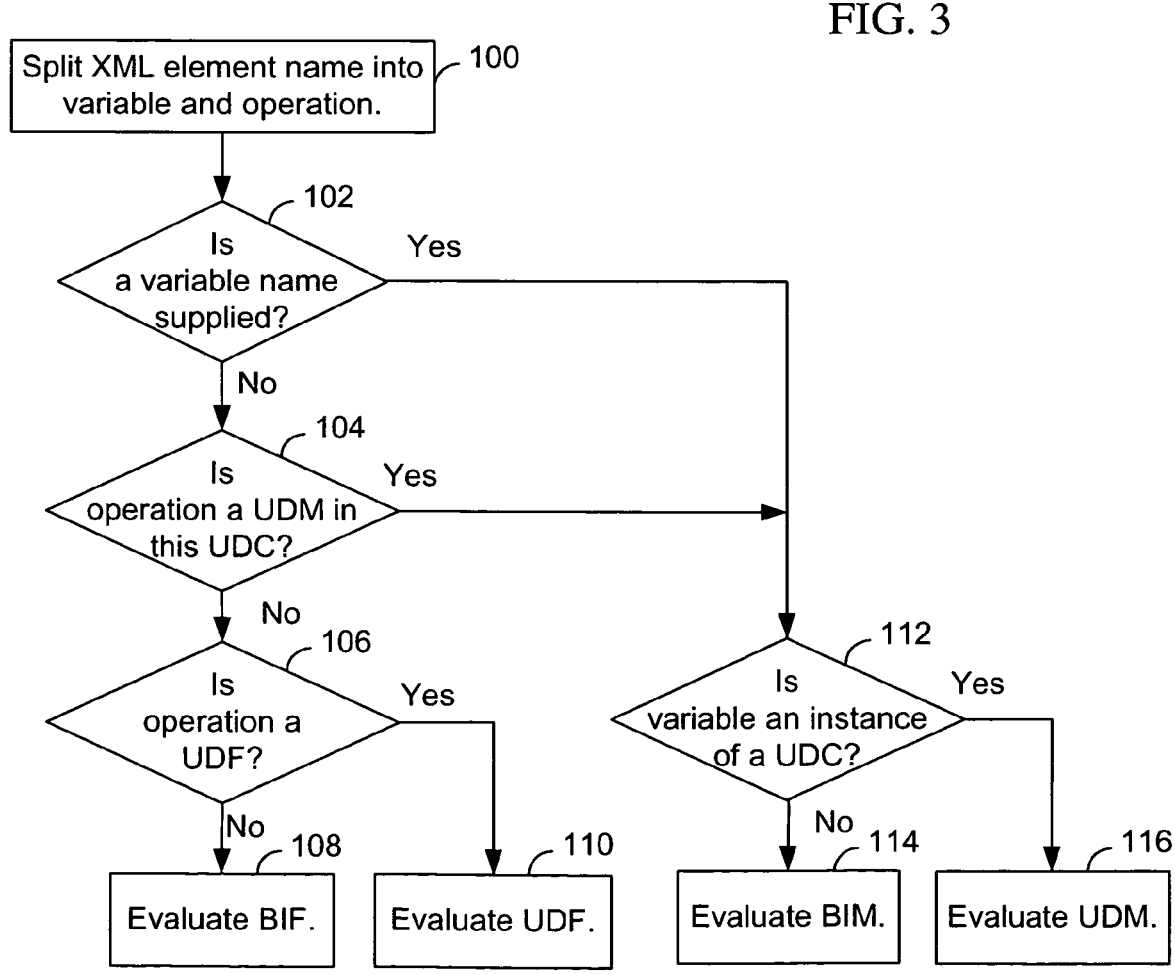
FIG. 5 depicts a flowchart of an embodiment of the step of evaluating an XML element node of FIG. 4.

FIG. 5 depicts a flowchart of an embodiment of the step of evaluating an XML element node of FIG. 4. In various embodiments, an XML element name, or component name, of an XML element node comprises a variable and an operation, and is specified as follows: variable.operation. When an element name does not contain a dot, no variable is specified, and the XML element name contains an operation. In step 100, the XML element name of the XML element node is split into a variable and an operation. Step 102 determines whether a variable name is specified. If no variable name is specified, step 104 determines whether an operation is a user-defined method (UDM), defined by a "DefineMethod" built-in function, in this user-defined class (UDC), defined by a "DefineClass" built-in function. The scripting language module searches the XML script for a UDM name in the current UDC that matches the operation in the element name. When step 104 determines that the operation is not a UDM in this UDC, in other words, no UDM name in the current UDC matched the operation, step 106 determines whether the operation is a user-defined function (UDF). The scripting language module searches the XML script to find a function name defined by a "DefineFunction" built-in function that matches the operation. When step 106 determines that the operation is not a user-defined function, in other words, no matching function name defined by a "DefineFunction" built-in function was found, the operation is a built-in function, and in step 108, the built-in function is evaluated. When step 106 determines that the operation is a user-defined function, in other words, a matching function name defined by a "DefineFunction" built-in function was found, in step 110, the user-defined function is evaluated.

When step 104 determines that the operation is a user-defined method in this class, that is, the current class, the variable name defaults to "this" and also defaults to an unqualified method reference to the containing user-defined class. Step 112 determines whether the variable is an instance of a user-defined class. In some embodiments, the scripting language module uses the Java instance of operator to determine if the variable is an instance of DynamicSubclass, the internal Interpreter class to which all user-defined classes belong. When the variable is not an instance of a user-defined class, the name of the element node is for a built-in method (BIM), and in step 114, the built-in method is evaluated. The built-in method is evaluated using the class of the variable of the element name. In various embodiments, the scripting language module uses the Java reflection APIs to provide access to external Java methods.

When step 112 determines that the variable is an instance of a user-defined class, in step 116, the user-defined function (UDF) is evaluated. When step 102 determines that a variable name was supplied, step 102 proceeds to step 112.

Figure 6:
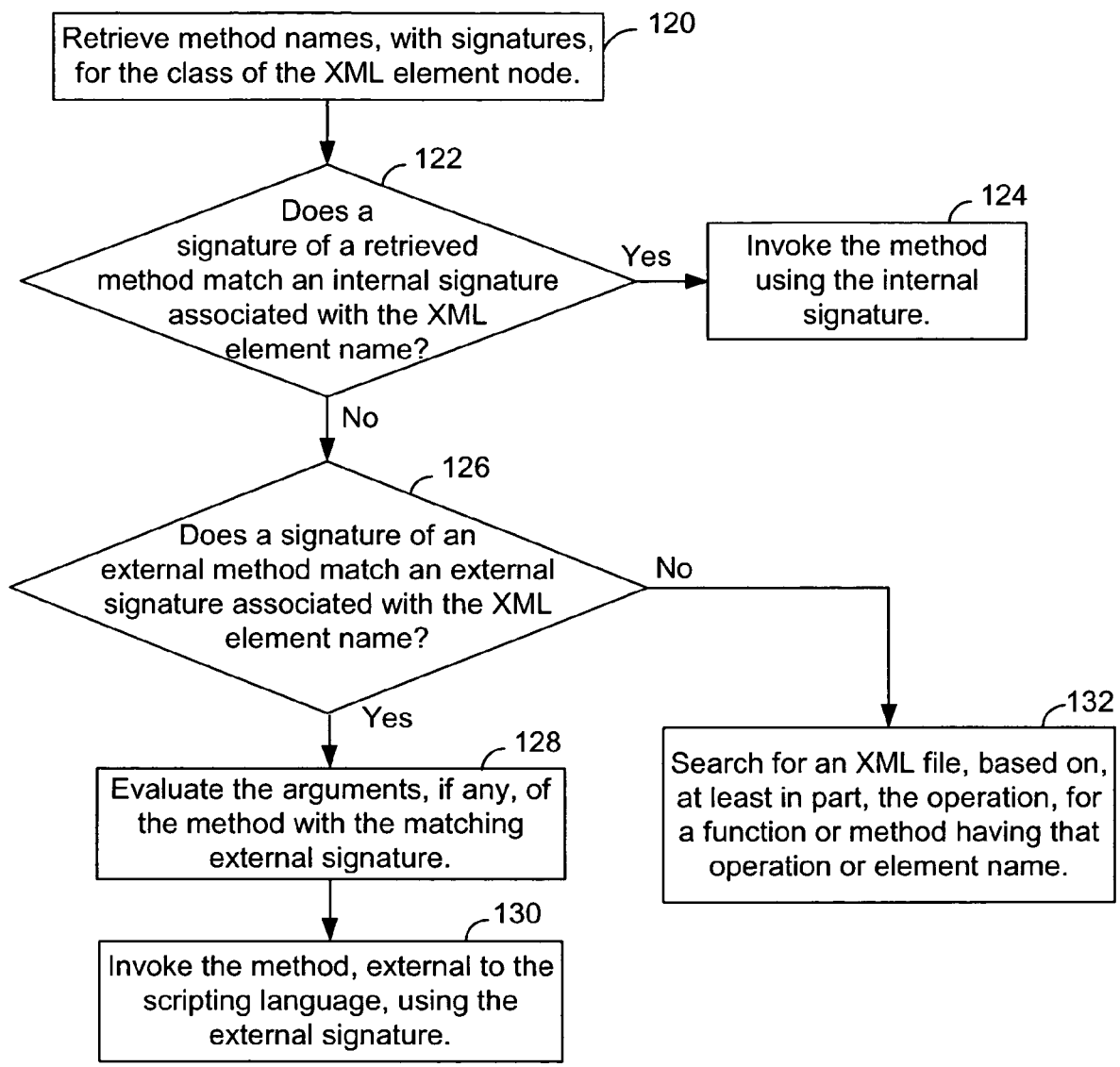
FIG. 6 depicts a flowchart of an embodiment of evaluating a built-in function or a built-in method of FIG. 5.

FIG. 6 depicts a flowchart of an embodiment of evaluating a built-in function or a built-in method. In various embodiments, the flowchart of FIG. 6 implements step 108 of FIG. 5 to evaluate a built-in function and step 114 of FIG. 5 to evaluate a built-in method.

In some programming languages, such as Java, a method is uniquely identified by its method signature, which is the name of the method, and the number and type of arguments to the method. In the scripting language module, the built-in functions are implemented as interpreter methods within the Interpreter class. The name of an interpreter method is the same as the name of its associated built-in function. For example, the name of the interpreter method associated with the "Print" built-in function is also "Print."

For built-in functions, there is no variable, therefore, by default the variable name is "this" which is associated with the Interpreter class. Therefore, the XML element name for a built-in function comprises the operation name for "this" class. For built-in methods, the associated class is the class of the instance of the variable of the XML element name.

An XML element node has an internal signature comprising the operation, a number of arguments equal to one and an argument type of org.w3c.dom.Node, which is a standard class name in the document object model.

In various embodiments, a built-in function has a signature comprising its associated interpreter method name, a number of arguments equal to one, and a predetermined argument type, which in some embodiments is org.w3c.dom.Node. In other embodiments, the built-in function has a signature comprising its associated interpreter method name, a number of arguments equal to one, and a predetermined argument type of a node object other than org.w3c.dom.Node. A signature having the predetermined argument type is considered to be an internal signature, otherwise the signature is considered to be an external signature.

In step 120, the method names, complete with signatures, for the class of the XML element node being evaluated are retrieved and, in various embodiments, are stored in an array, and in other embodiments, stored in a list. In some more particular embodiments, all of the method names, complete with signatures, for the class of the XML element are retrieved using the Java reflection API, and stored in a method array of instances, which have attributes such as the name of the method, the number of arguments to the method and the type of the arguments.

Step 122 determines whether a signature of a retrieved method matches an internal signature associated with the XML element name. In step 122, the array is searched for a method name that matches the operation of the XML element name of the XML element node. Some programming languages, such as Java, are polymorphic, meaning that multiple method names with different argument lists are allowed. For those method name(s) that match the operation name, step 122 searches for an argument list in the array that matches the argument list of the signature of the XML element node and that has an argument type matching the predetermined argument type. When a method name and argument list of the array matches the predetermined argument type and matches the operation and the argument list, respectively, of the XML element node, the signature of a retrieved method matches the signature of the associated XML element node; otherwise, the signatures do not match. For example, in some embodiments, for the "Print" built-in function, an interpreter method having a method name of "Print," is found, and that interpreter method has a single argument of type org.w3c.com.Node.

When step 122 determines that a method of the array matches the signature associated with the XML element node, the retrieved method having the matching signature is an interpreter method and step 124 invokes that method using the internal signature associated with the XML element name. In some more particular embodiments, once a matching method is found, the argument value(s) specified in the corresponding script reference are assembled into a Java Object array and the method is invoked using the Java reflection API, for example, using the "invoke" method of the standard Java "Method" reflection API class. In this way, the built-in function is invoked.

When step 122 determines that no retrieved method matches the internal signature associated with the XML element name, step 126 determines whether a signature of an external method matches an external signature associated with the XML element name. In this way, step 126 determines whether a built-in method is invoked. The built-in method is an external method having an external signature. The external signature comprises a name, number of arguments and type of arguments in the argument list of the method. In some embodiments, step 126 searches for an external signature having an argument list that matches the number and type of the argument(s) supplied in the XML element node.

When step 126 determines that a retrieved method matches the external signature associated with the XML element name, in step 128, the arguments to the external method are evaluated. In step 130, the external method is invoked using the external signature. In this way, a built-in method is invoked. In some more particular embodiments, once a matching external method is found, the argument value(s) specified in the corresponding XML script reference are assembled into a Java Object array and the external method is invoked using the Java reflection API, for example, using the "invoke" method of the standard Java "Method" reflection API class.

When step 126 determines that the signature associated with the XML element name does not match an external signature, in step 132, the scripting language module searches for an XML file containing a user-defined function. In various embodiments, when a function or method reference cannot be resolved to a function that is defined in the current XML script, the scripting language module automatically searches for a file containing the function. In some embodiments, the scripting language module appends the suffix ".xml" to the operation and searches for a file with this name in the directories listed in a predetermined path, which, in some embodiments, is the Java class path. For example, for an XML element having an operation of "myExternalFunction," the scripting language module searches for a file called "myExternalFunction.xml." In some embodiments, the path, and in some more particular embodiments, the Java class path, can be specified on a command line or in an environment variable.

In various embodiments, additional built-in functions are added by deriving a new class of the Interpreter class and defining new interpreter methods. Existing interpreter methods can be overridden by derived classes to provide further customization. In some alternate embodiments, the built-in functions are considered convenience functions when their functions can be accessed using standard Java classes.

In various embodiments, an XML script may comprise user-defined functions and/or methods with arguments. Those arguments are evaluated when the "EvaluateArgument" built-in function is specified in the XML script. The "EvaluateArgument" built-in function evaluates an item passed as an argument by the caller. The argument number in the caller is specified by the item, which is zero based. In other embodiments, the argument number is not zero based. A "GetArgumentCount" built-in function is used to get the number of arguments passed by the caller. An argument is evaluated each time that the "EvaluateArgument" built-in function is called. This makes it possible to implement functions that provide flow-of-control capabilities. The "EvaluateArgument" built-in function returns the result of evaluating the item. The "EvaluateArgument" built-in function can appear within a user-defined function, method and class constructor definition.

Figure 7:
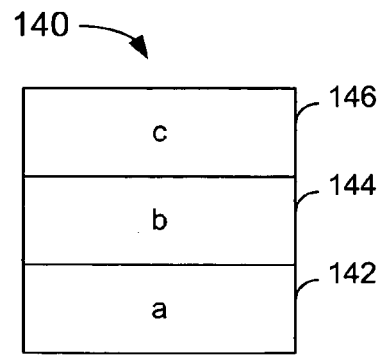
FIG. 7 depicts an exemplary stack.

FIG. 7 depicts a block diagram illustrating an exemplary stack 140. A stack frame contains a context for a function. The context comprises the arguments for the function. For example, for the stack frame of FIG. 7, function "a" invokes function "b" which invokes function "c". An exemplary script fragment which defines functions "a", "b" and "c", and results in the stack frame of FIG. 7 when function "a" is invoked, is as follows:

```
<DefineFunction>
    <Name>a</Name>
    <Block><b/></Block>
</DefineFunction>
<DefineFunction>
    <Name>b</Name>
    <Block><c/></Block>
```

-continued

```
</DefineFunction>
<DefineFunction>
    <Name>c</Name>
    <Block> ... </Block>
</DefineFunction>
```

In the example above, functions "a", "b" and "c" contain no arguments.

Stack frame 142 contains the context for function a. The context contains information used to evaluate the function. In some embodiments, the information comprises the local variables for the function, as well as a reference to the calling function. Stack frame 144 contains the context for function b. Stack frame 146 contains the context for function c. In this example, neither function "a", "b" or "c" invokes the "EvaluateArgument" built-in function.

Figure 8:
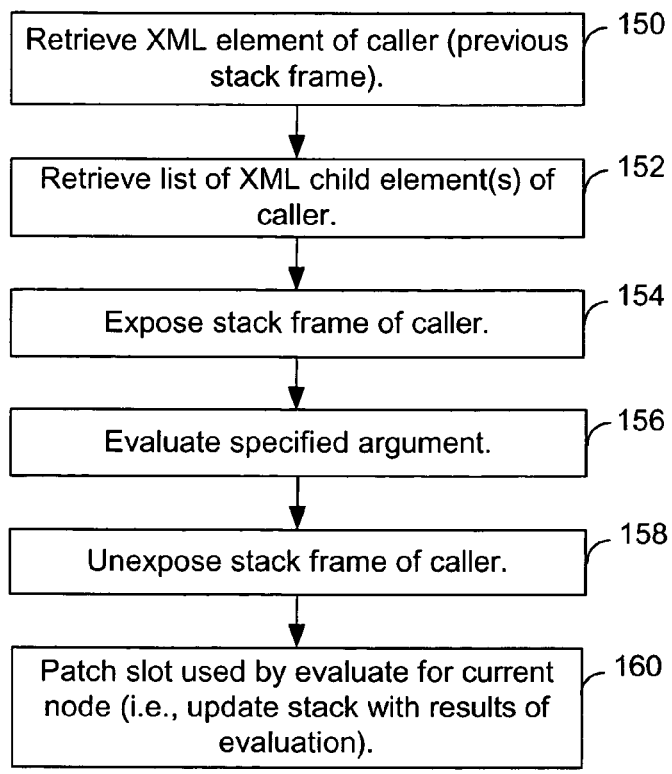
FIG. 8 depicts a flowchart of an embodiment of evaluating an argument for a user-defined function or method.

FIG. 8 depicts a flowchart of an embodiment of evaluating an argument. The flowchart of FIG. 8 is invoked when an "EvaluateArgument" built-in function is evaluated. In step 150, the XML element of the caller, that is the previous stack frame, is retrieved. In step 152, a list of the XML child element(s), that is, the argument list, of the caller is retrieved. In step 154, the stack frame of the caller is exposed. The stack has a pointer to the stack frame associated with the current function. To expose the stack frame associated with the current function, the pointer is moved to point to the end of the stack frame associated with the previous, that is, the caller, function.

In step 156, the argument specified in the "EvaluateArgument" function is evaluated. In step 158, the stack frame of the caller is unexposed. In other words, the pointer is restored to point to the stack frame associated with the current function. A reference to the node currently undergoing evaluation is kept on the call stack. Because executing an "EvaluateArgument" function is like evaluating that argument within the context of the caller, when the "EvaluateArgument" function is done, the "EvaluateArgument" function has potentially updated the current node reference for the stack frame for the function that contained the call to EvaluateArgument. In step 160, the stack frame storage location (or slot) that holds a reference to the user-defined function that is undergoing evaluation is refreshed (i.e. patched) with the value it had on entry to EvaluateArgument.

Figure 9:
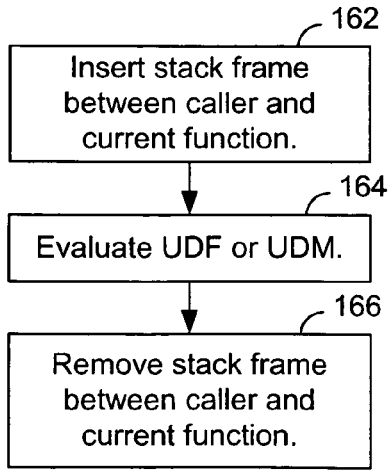
FIG. 9 depicts a flowchart of an embodiment of the step of evaluating a specified argument of FIG. 8.

FIG. 9 depicts a flowchart of an embodiment of the step of evaluating a specified argument of FIG. 8. In step 162, a stack frame is inserted between the caller and the current function. In step 164, the specified argument is evaluated as a user-defined function (UDF) or user-defined method (UDM). In step 166, the stack frame between the caller and called function is removed.

The operation of the flowchart of FIG. 9 will now be described by way of example, with reference to FIG. 10. In the following example, a variable name, called "var", is set equal to 3.14, and a set of functions are nested as arguments within a "Print" function as follows:

```
<Set><Name>var</Name><Value>3.14</Value></Set>
<Print>
    <p><q><r><Get><Name>var</Name></Get></r></q></p>
</Print>
```

In the example above, function "p" is an argument of the "Print" function, function "q" is an argument of function "p", function "r" is an argument of function "q", and built-in function. The function "Get" is an argument of function "r". In this example, a "Get" function is used as an argument to function "r" because the variable reference is resolved by "Get" in the context of the caller. Although function "r" is nested three levels deep, function "r" evaluates its argument, the variable, "var," containing 3.14, in the context of function "p's" caller, that is, the "Print" function. Function "p" is defined as shown below, and will subsequently invoke "EvaluateArgument" to evaluate its argument, (function "q" in the above example) and return the value of the argument to its caller (the built-in function "Print" in the above example):

```
<DefineFunction>
    <Name>p</Name>
    <Block>
        <Return>
            <EvaluateArgument>
                <Value>0</Value>
            </EvaluateArgument>
        </Return>
    </Block>
</DefineFunction>
```

Function "q" is defined as shown below, and will invoke "EvaluateArgument" to evaluate its argument (function "r" in the above example) and return the value of the argument to its caller (function "p" in the above example):

```
<DefineFunction>
    <Name>q</Name>
    <Block>
        <Return>
            <EvaluateArgument>
                <Value>0</Value>
            </EvaluateArgument>
        </Return>
    </Block>
</DefineFunction>
```

Function "r" is defined as shown below, and will invoke "EvaluateArgument" to evaluate its argument (in the above example, the Get built in function, which gets the value of a variable) and return the value of the argument to its caller (function "q" in the above example):

```
<DefineFunction>
    <Name>r</Name>
    <Block>
        <Return>
            <EvaluateArgument>
                <Value>0</Value>
            </EvaluateArgument>
        </Return>
    </Block>
</DefineFunction>
```

Figure 10:
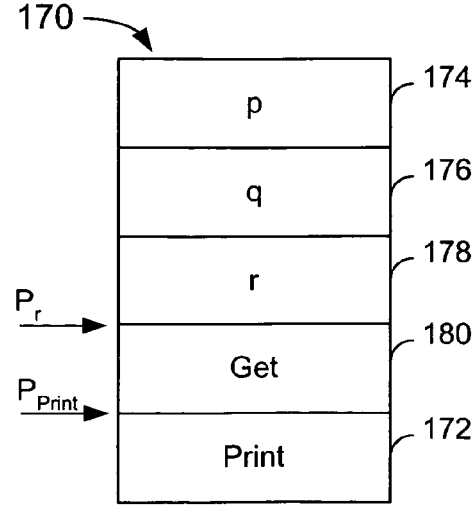
FIG. 10 depicts the exposure of an exemplary stack frame of another exemplary stack.

FIG. 10 depicts the exposure of an exemplary stack frame of an exemplary stack 170. The "Print" built-in function is associated with stack frame 172. The "Print" function, that is, the "caller of p," calls user-defined function "p." This pushes the stack frame 174 for user-defined function "p" on the top of the stack. User-defined function "p" then invokes Evaluate-Argument which inserts the stack frame 176 for user-defined function "q" on the stack (below the stack frame 174 for user-defined function "p"). User-defined function "q" invokes EvaluateArgument which inserts the stack frame 178 for user-defined function "r" on the stack (below the stack frame 176 for user-defined function "q"). This enables user-defined function "r" to access variable "var" in the scope of the caller of user-defined function "p", that is, the adjacent stack frame 172. The caller of user-defined function "p" is the built-in "Print" function.

In this example, the current function is function "r". Function "r" has invoked the "EvaluateArgument" built-in function to evaluate its argument, the "Get" built-in function. The stack has a pointer $P_r$ to the stack frame 178 associated with the current function, "r." To expose the stack frame 172, the pointer is moved to point to the end of the stack frame 174 associated with the caller of function "p" ("Print"), that is, pointer $P_{print}$. A stack frame 180 that is associated with the "EvaluateArgument" function that is invoked by function "r" is inserted between stack frames 172 and 178. The argument specified in the "EvaluateArgument" built-in function, argument zero, is evaluated. In this example, argument zero is the "Get" function, and the value "3.14" is printed. The stack frame 180 is removed. To unexpose the stack frame, the pointer is restored to point to the stack frame of the current function "r", that is, $P_r$. As each function returns to its caller, its corresponding stack frame is removed.

This stack insertion technique simplifies relative referencing for the next invocation of the "EvaluateArgument" built-in function because each nested function that contains a call to the "EvaluateArgument" built-in function exposes the previous stack frame relative to the current stack frame. For example, functions "p," "q" and "r" each have a single argument. For example, in the script fragment <p><q><r><Get<Name>var</Name></Get></r></q></p>, function "q" is an argument of function "p," function "r" is an argument of function "q," and "Get" is an argument of function "r." If functions "p," "q" and "r" each invoke the "EvaluateArgument" built-in function to evaluate their single argument, when r evaluates its argument, the variable "var" is evaluated in the scope of the caller of function "p," even though stack frames for functions "p," "q" and "r" are now on the stack. The stack frame "exposed" by the "EvaluateArgument" built-in function is the one that is beneath the current stack frame. When there are exposed frames present, new stack frames are not pushed on the top of the stack, but on top of the exposed stack frame, in other words, the new stack frames are inserted below the active stack frame.

In various embodiments, the scripting language module comprises one or more of the following built-in functions. These built-in functions are described below after their name.

Add

Add contains two items, item1, a first number to be added, and item2, a second number to be added, and returns the sum of item1 and item2.

AddBorder

AddBorder contains a single item, item1, the text to appear in the border. AddBorder adds a border around the controls in the dialog box, excluding the bottom row of buttons. AddBorder can appear within a dialog box definition.

AddButton

AddButton contains four items:
item1—row number of button
item2—column number of button
item3—text to appear on button
item4—item to execute when button is pressed AddButton adds a button to the dialog box definition at the row specified by item1 and the column specified by item2. The text to display on the button face is specified by item3. The action to take when the button is pressed is specified by item4, which is typically a Block that may contain references to GetDialogValue and CloseDialogBox. Rows are numbered from the top row down, starting at zero. Columns are numbered from the left column across, starting at zero. In some embodiments, controls are added to the dialog box in sequence, that is, with no missing rows or columns. AddButton can appear within a dialog box definition.

AddLabel

AddLabel contains three items:

item1—row number of label item2—column number of label item3—text to appear on label AddLabel adds a label to the dialog box definition at the row specified by item1 and the column specified by item2. The text to display on the label is specified by item3. Rows are numbered from the top row down, starting at zero. Columns are numbered from the left column across, starting at zero. In various embodiments, controls are added to the dialog box in sequence, that is, with no missing rows or columns. AddLabel can appear within a dialog box definition.

AddTextField

AddTextField contains two or three items:

item1—row number of label item2—column number of label item3—optional text to appear in field AddTextField adds an editable text field to the dialog box definition at the row specified by item1 and the column specified by item2. The text field is initialized with the value specified by item3, if specified, otherwise the field is empty. Rows are numbered from the top row down, starting at zero. Columns are numbered from the left column across, starting at zero. Controls are added to the dialog box in sequence, that is, with no missing rows or columns. AddTextField can appear within a dialog box definition.

And

And contains two items:

item1—first condition to be compared item2—second condition to be compared

And returns true if item1 and item2 are true, otherwise false.

BitAnd

BitAnd contains two items:

item1—first value to be AND'd item2—second value to be AND'd

BitAnd returns the bitwise AND of item1 and item2.

BitNot

BitNot contains a single item:

item1—value to be complemented

BitNot returns the bitwise NOT (one's complement) of item1.

BitOr

BitOr contains two items:

item1—first value to be OR'd item2—second value to be OR'd

BitOr returns the bitwise OR of item1 and item2.

Block

Block contains any number of items. Block evaluates each item in sequence and returns the value of the last item. Block can be used when a single item is specified, yet Block can evaluate one or more items.

Boolean

Boolean contains a single item, item1, a value to be converted to Boolean. Boolean evaluates item1 and returns the result as a boolean value. The numeric value zero is converted to boolean false. Any other numeric value is converted to boolean true. The character string value "true" is converted to boolean true. Any other the character string value is converted to boolean false.

Call

Call contains two items:

item1—function or method name item2—container for argument list

Call invokes a user defined function or method specified by item1, passing it the arguments contained in item2. Call returns the result of the function or method. Call exists as an alternative to specifying the function or method reference as an XML element node. Its purpose is to enable the validation of scripts using a standard XML Schema Definition (XSD) without using a custom schema definition that includes the standard XML schema and defines additional user defined functions and methods.

CloseDialogBox

CloseDialogBox contains no items. CloseDialogBox closes the current dialog box. The flow of control continues from OpenDialogBox. CloseDialogBox is typically invoked from an AddButton action block. The CloseDialogBox can appear within a dialog box definition.

CloseFile

CloseFile contains a single item, item1, a handle of a file to close. CloseFile closes the file specified by item1. To open a file, see OpenInputFile, OpenOutputFile or OpenUpdateFile. CloseFile returns null.

Concatenate

Concatenate contains any number of items. Concatenate evaluates each item in sequence and returns the string concatenation of the results.

CreateArray

CreateArray contains a single item, item1, a number of elements in an array. CreateArray creates an array with size specified by item1. SetElement is used to store a value in the array. GetElement is used to retrieve a value from the array. GetElementCount is used to get the number of elements in the array.

Divide

Divide contains two items:

item1—first number to be divided item2—second number to be divided

Divide returns the quotient of item1 divided by item2.

Float

Float contains a single item, item1, a value to be converted to floating point. Float evaluates item1 and returns the result as a floating point number.

EqualTo

EqualTo contains two items:

item1—first value to be compared item2—second value to be compared

EqualTo returns true if item1 is equal to item2, false otherwise.

Evaluate

Evaluate contains a single item, item1, an XML or arithmetic expression to evaluate. Evaluate evaluates item1 and returns the result. If item1 is an XML document, item1 is evaluated as a scripting language script, otherwise item1 is evaluated as an arithmetic expression. In some embodiments, an arithmetic expression uses infix notation and may contain any of the following, in order of increasing precedence:

```
Assignment
    =
Logical Operators
    And &&
    Or ||
Bitwise Operators
    And &
    Or |
Relational Operators
    LessThan <
    LessThanOrEqualTo <
    GreaterThan >
    GreaterThanOrEqualTo >
    EqualTo ==
    NotEqualTo !=
Terms
    Add +
    Subtract −
Factors
    Multiply *
    Divide /
Unary Operators
    Negative of −
    Positive of + (no operation)
    Bitwise Not ~
    Logical Not !
Parenthesis ( and )
Variables
Integer or Floating Point Numbers
Hexadecimal Numbers (with a 0x prefix)
```

ExtendClass

ExtendClass contains a single item, item1, a name of a class to extend. ExtendClass derives the current class from the class specified by item1 and returns a reference to the base class. Following a reference to ExtendClass, instance variables and methods in the base class are visible to the derived class. ExtendClass can appear within a DefineClass constructor. In some embodiments, item1 is the name of a user defined class.

FindLeft

FindLeft contains either two or three items:

item1—string to search item2—string to find item3—starting offset (optional)

FindLeft searches from the left for item2 in item1, optionally beginning at the zero based offset specified by item3 (defaults to zero). If item2 is found, FindLeft returns the zero based offset of item2 in item1, otherwise −1.

FindRight

FindRight contains either two or three items:

item1—string to search item2—string to find item3—starting offset (optional)

FindRight searches from the right for item2 in item1, optionally beginning at the zero based offset specified by item3 (defaults to zero). If item2 is found, FindRight returns the zero based offset of item2 in item1, otherwise −1.

For

For contains four items:

item1—initialization to perform at start of loop item2—condition to evaluate to execute body of loop item3—operation to perform at end of each loop item4—function to evaluate as body of loop For provides support for the familiar for loop. The items are evaluated as indicated above. Typically item1 is a Set that initializes a loop counter, item2 is a conditional, such as LessThan, that controls whether the body is executed, item3 is another Set that updates the loop counter, and item4 is a Block that constitutes the body of the loop. For returns the result of evaluating item4 on the final iteration.

Format

Format contains either one or two items:

item1—format definition item2—value to format (optional)

Format processes the format definition specified by item1, optionally using the value specified by item2, and returns a formatted character string. The scripting language supports formatting time. A time to format can be specified by item2. If item2 is not supplied, it defaults to the current time. The following characters may appear in the format definition for time:

HH—hour mm—minute ss—second

MM—month

DD—day yy or yyyy—year

Get

Get contains a single item, item1, a variable name. Get returns the value of the variable specified by item1. If the variable name begins with instance, it is an instance variable for a class. If the variable name begins with global, it is a system-wide global variable, otherwise it is a local variable. Values are stored in variables using the Set built-in function.

GetArgumentCount

GetArgumentCount contains no items. GetArgumentCount returns the number of items that were passed as arguments to the current function, method or class constructor. GetArgumentCount can appear within a function, method or class constructor definition.

GetAttributeCount

GetAttributeCount contains no items. GetAttributeCount returns the number of XML attributes that were specified in the XML element tag that resulted in the call to the function that is currently active. GetAttributeCount can appear within a function definition.

GetAttributeName

GetAttributeName contains a single item, item1, an argument number of an attribute (zero based). In other embodiments, the argument number is not zero based. GetAttributeName returns the name of the attribute at the position specified by item1 in the XML element tag that resulted in the reference to the function that is currently active. GetAttributeName can appear within a function definition.

GetAttributeValue

GetAttributeValue contains a single item, item1, an argument number of an attribute (zero based). In other embodiments, the argument number is not zero based. GetAttributeValue returns the value of the attribute at the position specified by item1 in the XML element tag that resulted in the reference to the function that is currently active. GetAttributeValue can appear within a function definition.

GetDialogValue

GetDialogValue contains two items:

item1—row number of value to get item2—column number of value to get

GetDialogValue retrieves the value of the control at the row specified by item1 and the column specified by item2 in a dialog box. GetDialogValue is typically used within an AddButton action to retrieve the value of an edit field. Rows are numbered from the top row down, starting at zero. Columns are numbered from the left column across, starting at zero. In some embodiments, controls are be added to the dialog box in sequence, i.e. with no missing rows or columns. GetDialogValue can appear within a dialog box definition.

GetElement

GetElement contains two items:

item1—variable containing array item2—element number to retrieve

GetElement retrieves the value at the index specified by item2 from the array specified by item1. CreateArray is used to create an array. SetElement is used to store a value in an array. GetElementCount is used to get the number of elements in the array.

GetElementCount

GetElementCount contains a single item, item1, a variable containing a reference to an array. GetElementCount returns the number of items in the array specified by item1. CreateArray is used to create an array. SetElement is used to store a value in an array. GetElement is used to retrieve a value from the array.

GreaterThan

GreaterThan contains two items:

item1—first value to be compared item2—second value to be compared

GreaterThan returns true if item1 is greater than item2, otherwise false.

GreaterThanOrEqualTo

GreaterThanOrEqualTo contains two items:

item1—first value to be compared item2—second value to be compared

GreaterThanOrEqualTo returns true if item1 is greater than or equal to item2.

If

If contains either two or three items:

item1—condition to check item2—item to evaluate if condition is true item3—item to evaluate if condition is false (optional)

If provides support for the familiar if loop. The items are evaluated as indicated above. If the condition specified by item1 evaluates to true, If returns the result of evaluating item2, otherwise If returns the result of evaluating item3.

ImplementInterface

ImplementInterface contains a single item, item1, a name of the implemented Java interface. ImplementInterface implements a Java interface. ImplementInteface returns a reference to the interface that can be used in subsequent references to Java objects that require a reference to an interface. ImplementInterface can appear within a DefineClass constructor. The current class contains a DefineMethod for each method in the interface that is implemented.

Input

Input contains no items; Input reads a line of input from the console and returns it.

InstanceOf

InstanceOf contains two items:

item1—reference to a variable item2—name of a class to check

InstanceOf returns true when the variable specified by item1 is an instance of (i.e. its class is derived from) the class specified by item 2, otherwise Instance of returns false.

Integer

Integer contains a single item, item1, a value to be converted to an integer. Integer evaluates item1 and returns the result as an integer.

Length

Length contains a single item, item1, a string to be sized. Length returns the number of characters in the string specified by item1.

LessThan

LessThan contains two items:

item1—first value to be compared item2—second value to be compared

LessThan returns true if item1 is less than item2, otherwise false.

LessThanOrEqualTo

LessThanOrEqualTo contains two items:

item1—first value to be compared item2—second value to be compared

LessThanOrEqualTo returns true if item1 is less than or equal to item2.

Loop

Loop contains a single item, item1, an item to evaluate. Loop repeatedly evaluates item1, which is typically a Block. To prevent an infinite loop, a block includes a Return.

Matches

Matches contains two items:

item1—string to test item2—regular expression

Matches returns true if the string specified by item1 matches the pattern specified by item2.

Modulo

Modulo contains two items:

item1—first number to be divided item2—second number to be divided

Modulo returns the remainder following integer division of item1 by item2.

Multiply

Multiply contains two items:

item1—first number to be multiplied item2—second number to be multiplied

Multiply returns the product of item1 multiplied by item2.

Name

Name contains a single item, item1, a name of an object. Name provides a mechanism for supplying user defined names for variables, functions, classes, methods, etc. Name returns the value specified by item1. Name and Value are functionally identical, but are used in different contexts.

Nop

Nop contains any number of items and is a "no operation". In some embodiments, Nop makes a useful place holder. Nop returns null.

Not

Not contains a single item, item1, a condition to be negated. Not returns true if item1 is false, otherwise false.

NotEqualTo

NotEqualTo contains two items:

item1—first value to be compared item2—second value to be compared

NotEqualTo returns true if item1 is not equal to item2.

Null

Null contains no items. Null returns a special null reference that can be distinguished from a reference to any other value. Null can be used to initialize a variable to null or to see if a variable contains a reference to a value.

OpenDialogBox

OpenDialogBox contains two items:

item1—dialog box title item2—body of new dialog box

OpenDialogBox defines and opens a dialog box. The title is specified by item1. The controls (labels, edit fields, buttons, etc.) are specified by item2, which is typically a Block containing AddBorder, AddButton, AddLabel and AddTextField. A call to CloseDialogBox appears somewhere within the body, typically within an AddButton action. OpenDialogBox returns after CloseDialogBox is called.

OpenInputFile

OpenInputFile contains a single item, item1, a name of a file to open. OpenInputFile opens a file for reading and returns a handle to the file that can be used in subsequent calls to Read and CloseFile.

OpenOutputFile

OpenOutputFile contains a single item, item1, a name of a file to open. OpenOutputFile opens a file for writing and returns a handle to the file that can be used in subsequent calls to Write and CloseFile.

OpenUpdateFile

OpenUpdateFile contains a single item, item1, a name of file to open. OpenUpdateFile opens a file for reading and writing and returns a handle to the file that can be used in subsequent calls to Read, Write, Seek, Tell, Truncate and CloseFile.

Or

Or contains two items:
item1—first condition to be compared
item2—second condition to be compared Or returns true if either item1 or item2 is true, otherwise false.

Print

Print contains a single item, item1, a value to be printed. Print prints the value specified by item1 to the console. To print multiple items on the same line, Print is used with Concatenate. Print returns item1.

Read

Read contains one or two items:
item1—handle of file to read
item2—optional number of bytes to read Read reads from the current position in the file specified by item1 and returns the resulting value. The file is opened using OpenInputFile or OpenUpdateFile prior to the read. If item2 is specified, Read reads the number of bytes specified. If item2 is not specified, then Read reads up to the next end of line indicator. If Read detects end of file while reading, it returns the amount that it has read so far. If Read is called again at end of file, it returns a value of length zero.

ReplaceAll

ReplaceAll contains three items:
item1—string to search
item2—regular expression
item3—string to replace ReplaceAll returns a new string where all of the occurrences of the text that matches item2 in item1 have been replaced by item3.

ReplaceFirst

ReplaceFirst contains three items:
item1—string to search
item2—regular expression
item3—string to replace ReplaceFirst returns a new string where the first occurrence of the text that matches item2 in item1 has been replaced by item3.

Return

Return contains at most one item, item1, a value to return, which is optional. Return causes the current function or method to return to its caller. If item1 is specified, it returns it as the function's return value. Otherwise it returns null.

Seek

Seek contains either one or two items:
item1—handle of file to set current position
item2—optional file offset or position Seek sets the current position of the file specified by item1. To use Seek, the file is opened using OpenUpdateFile. If item2 is specified, it is used as the new position. Otherwise, the file is positioned at end of file. Subsequent Read and Write operations take place from the current position. Seek returns null.

SetElement

SetElement contains three items:
item1—variable containing array
item2—element number to store
item3—value to store in array SetElement stores the value specified by item3 at the index specified by item2 in the array specified by item1. CreateArray is used to create an array. GetElement is used to retrieve a value in an array. GetElementCount is used to get the number of elements in the array.

Set

Set contains two items:
item1—name of variable to set
item2—value to set variable to Set evaluates item2 and sets the variable specified by item1 to the result. Set returns the result. If the variable name begins with "instance", the variable is an instance variable for a class. If the variable name begins with "global", the variable is a system-wide global variable. Otherwise, the variable is a local variable. Values are retrieved from variables using the Get built-in function.

For example, variable1 is set equal to ten as follows:

```
<Set>
  <Name>variable1</Name>
  <Value>10</Value>
</Set>
```

In another example, variable1 is set equal to a value returned by a user-defined function called myFunction1, as follows:

```
<Set>
  <Name>variable1</Name>
  <myFunction1></myFunction1>
</Set>
```

Split

Split contains two items:
item1—string to split
item2—regular expression

Split splits the string specified by item1 into pieces using the pattern specified by item2 to identify the boundaries. It returns an array, with one piece per element. To access the elements in the array, see GetElement.

Stop

Stop contains no items. Stop throws a StopException. By default, a StopExecution terminates execution immediately, but it can be caught using Try.

String

String contains a single item, item1, the value to be converted to a string. String evaluates item1 and returns its value as a string.

Substring

Substring contains either two or three items:
item1—string to process
item2—starting offset
item3—ending offset (optional)

Substring returns the substring of item1, starting at the zero based offset specified by item2 and running up to the offset give by the optional item3. If item3 is not specified, the substring extends to the end of the string.

Subtract

Subtract contains two items:

item1—first number to be subtracted item2—second number to be subtracted

Subtract returns the difference of item2 subtracted from item1.

Tell

Tell contains a single item, item1, the handle of the file to get current position. Tell returns the current position of the file specified by item1. The file is opened using OpenUpdateFile.

Throw

Throw contains a single item, item1, the exception to throw. Throw evaluates item1 and throws it as an exception. The resulting exception can be caught by Try. If the exception is not caught, then execution of the current program will terminate. If item1 is an instance of a Java exception, it is thrown as-is. Otherwise item1 is wrapped with an InterpreterException. Throw does not return.

ToLowerCase

ToLowerCase contains a single item, item1, a string to convert to lower case. ToLowerCase returns a new string consisting of the string specified by item1, where all upper case characters have been converted to lower case.

ToUpperCase

ToUpperCase contains a single item, item1, a string to convert to upper case. ToUpperCase returns a new string consisting of the string specified by item1, where all lower case characters have been converted to upper case.

Trim

Trim contains a single item, item1, a string to trim. Trim returns a new string consisting of the string specified by item1, with all leading and trailing white space removed.

Try

Try contains a single item, item1, an item to try for exceptions. Try evaluates item1, which is typically an occurrence of Block, and catches any exceptions that may be generated by it. This includes user defined exceptions generated by Throw as well as system generated Java exceptions. Try returns a reference to the exception if it caught one, otherwise Null.

Truncate

Truncate contains either one or two items:

item1—handle of file to truncate item2—optional file offset or position

Truncate truncates the file specified by item1. The file is opened using OpenUpdateFile. If item2 is specified, it is used as the new length. Otherwise, the file is truncated at the current position. Truncate returns null.

Until

Until contains two items:

item1—condition to check item2—item to evaluate until condition is true

Until provides support for the familiar until loop. Until evaluates item2, which is typically a Block, and then evaluates item1. If the result of evaluating item1 is false, then item2 and item1 are evaluated again. This process repeats until item1 returns true. Until returns the result of evaluating item2.

Value

Value contains a single item, item1, a value of an object. Value provides a mechanism for supplying user defined values for numeric, character string and Boolean literals, that is, constants. Value returns the value specified by item1. In some embodiments, Value and Name are functionally identical, but are used in different contexts.

While

While contains two items:

item1—condition to check item2—item to evaluate while condition is true

While provides support for the familiar while loop. While evaluates item1. If the result is true, While evaluates item2 (which is typically a Block). This process is repeated until item1 returns false. While returns the result of evaluating item2.

Write

Write contains two or three items:

item1—handle of file to write item2—value to write item2—optional number of bytes to write Write writes the value specified by item2 at the current position in the file specified by item1. The file is opened using OpenOutputFile or OpenUpdateFile. If item3 is specified, Write writes the number of bytes specified. If item2 is not specified, then Write writes the value, followed by an end of line indicator. Write returns null.

The foregoing description of the preferred embodiments of the inventions has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A method for processing element nodes of an extensible-markup language (XML) script the method comprising:

determining that a current element node of the XML script is an argument of an first element node of the XML script, and placing a current stack frame associated with the current element node in a stack above a first stack frame associated with the first element node;

determining that the current element node requires evaluation of a new argument of the current element node, the new argument being a new element node of the XML script;

inserting a new stack frame associated with the new element node for evaluating the new argument into the stack below the current stack frame associated with the current element node rather than above the current stack frame to simplify relative referencing for evaluation of a subsequent nested argument;

evaluating the new argument using the inserted new stack frame; returning a result from evaluation of the new argument to the current element node; and removing the inserted new stack frame from the stack after returning the result from evaluation of the new argument to the current element node and before removing the current stack frame; and repeating the determining, inserting, evaluating returning and removing steps until all the element nodes of the XML script are evaluated.

2. The method of claim 1 wherein the new element node of the XML script requires evaluation of another argument.

3. The method of claim 2, further comprising:

inserting another new stack frame for evaluating the other argument into the stack below the inserted new stack frame;

evaluating the other argument using the other inserted new stack frame;

returning a result from evaluation of the other argument to the new element node; and removing the other inserted new stack frame from the stack after returning the result from evaluation of the other argument to the new element node and before removing the stack frame associated with the new element node.

4. The method of claim 1, wherein the current element node of the XML script comprises a component name that references a component, the component being one of a built-in function, a built-in method, a user-defined function, and a user-defined method.

5. The method of claim 4, wherein the component is defined externally to XML and the XML script.

6. The method of claim 5, wherein the component is in JAVA programming language.

7. The method of claim 1, wherein the current stack frame comprises a reference to a related element node.

8. The method of claim 1, wherein the current stack frame comprises a local variable.

9. The method of claim 1, wherein the new stack frame is inserted in the stack below the current stack frame and above the first stack frame.

10. The method of claim 1 wherein the new argument is included in a context of the current stack frame.

11. A method for processing element nodes of an extensible-markup language (XML) script, the method comprising:
  adding a first stack frame to a stack, the first stack frame associated with a first element node of the XML script, the first element node having a first argument that is a current element node of the XML script, the first element node requiring evaluation of the first argument to evaluate the first element node;
  adding a current stack frame to the stack above the original stack frame, the current stack frame associated with the current element node;
  determining that a new element node of the XML script is a current argument of the current element node, the current element node requiring evaluation of the current argument to evaluate the current element node;
  exposing the first stack frame, including setting a pointer of the stack to point to an end of the first stack frame;
  evaluating the current argument, including:
    inserting a new stack frame associated with the new element node into the stack, the new stack frame being inserted above the first stack frame and below the current stack frame rather than above the current stack frame, to simplify relative referencing for evaluation of a subsequent nested argument;
    evaluating the current argument using the new stack frame;
    returning a result from evaluation of the current argument to the current element node; and
    removing the new stack frame from the stack after returning the result from evaluation of the current argument to the current element node and before removing the current stack frame; and
  repeating the determining, inserting, evaluating returning and removing steps until all the element nodes of the XML script are evaluated.

12. A method as recited in claim 11 further comprising unexposing the first stack frame by setting the pointer of the stack to the current stack frame after removing the new stack frame.

13. A method as recited in claim 11 wherein the new element node, the current element node, and the first element node each comprise a component name that references a function.

14. A method as recited in claim 11, wherein the new element node, the current element node, and the first element node each comprise a component name that references a component, the component being one of a built-in function, a built-in method, a user-defined function, and a user-defined method.

15. A method as recited in claim 11, wherein the first stack frame is associated with a built-in function, and the current stack frame and the new stack frame are each associated with a different user-defined function.

\* \* \* \* \*